(12) United States Patent
Cuervo (10) Patent No.: US 8,295,170 B2
(45) Date of Patent: Oct. 23, 2012

(54) PCRF-PCEF-OCS INTERACTION IN WIRELESS-WIRELINE CONVERGENCE

(75) Inventor: Fernando Cuervo, Dunrobin (CA)

(73) Assignee: Alcatel Lucent, Paris (FR)

( * ) Notice: Subject to any disclaimer, the term of this patent is extended or adjusted under 35 U.S.C. 154(b) by 183 days.

(21) Appl. No.: 12/824,817

(22) Filed: Jun. 28, 2010

(65) Prior Publication Data

US 2011/0320323 A1 Dec. 29, 2011

(51) Int. Cl.
*H04L 12/56* (2006.01)
(52) U.S. Cl. .......................... 370/230; 455/406; 705/30
(58) Field of Classification Search .................. 455/406, 455/466; 370/230, 231, 401, 469, 352; 707/741; 379/142.04
See application file for complete search history.

(56) References Cited

U.S. PATENT DOCUMENTS

| 7,979,439 B1* | 7/2011 | Nordstrom et al. ........... 707/741 |
| 2009/0109845 A1* | 4/2009 | Andreasen et al. ........... 370/230 |

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

*Primary Examiner* — Phuoc Doan
(74) *Attorney, Agent, or Firm* — Kramer & Amado, PC (57) ABSTRACT

Various embodiments relate to a system and related method for charging an actual subscriber using a single subscriber profile. A Policy and Charging Rules Node (PCRN) may receive a message including a service request and may refer to a subscriber profile to add at least one subscriber identifier (ID) to the message. An Online Charging System (OCS) may thereafter receive a translated message originating from the PCRN and use the at least one subscriber ID included in the translated message to find charging information for the actual subscriber. The OCS may include the charging information in a charged message. A device providing service may then use the charged information to charge the actual subscriber for the requested service.

27 Claims, 7 Drawing Sheets

PCRF-PCEF-OCS INTERACTION IN WIRELESS-WIRELINE CONVERGENCE

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed solely for voice communications has recently grown into a heterogeneous system that enables access to communications platforms such as text messaging, multimedia streaming along with general Internet access. To support such applications, service and infrastructure providers have built new networks over existing voice communication infrastructure. While this has enabled added functionality without appreciable service interruptions, such makeshift modifications have served as less-than-ideal long-term solutions for a communications infrastructure. As evidenced by second and third generation networks, voice services must be carried over dedicated voice channels toward a traditional circuit-switched core, while other services, such as IP-enabled data and communications may be transmitted over a different packet-switched core, following Internet protocol (IP). This has led to unique problems, including, for example, application provision, metering and charging, and quality of experience (QoE) assurance.

One recent attempt to enhance the dual-core approach of the second (2G, 2.5G) and third generations (3G) of mobile telecommunications standards defined by the International Telecommunications Union has been in the form of a new set of standards. The Third Generation Partnership Project (3GPP) has recommended a new network scheme deemed 'Long Term Evolution' (LTE). Under the new standards, all communications in an LTE network are carried over an IP channel from user equipment (UE), such as a mobile phone or smartphone, to an all-IP core named the Evolved Packet Core (EPC). The EPC may then provide gateway access to other networks, while also ensuring an acceptable QoE for a user's network activity and properly charging the subscriber for such activity.

The 3GPP generally describes the components of the EPC and their interactions with each other for example, describing components such as a Policy and Charging Rules Function (PCRF), Policy and Charging Enforcement Function (PCEF), and Bearer Binding and Event Reporting Function (BBERF) of the EPC.

In view of the foregoing, it would be desirable to provide a system and method more capable of charging actual subscribers. In particular, it would be desirable to provide a system that may use coordinated subscriber records for charging within both the LTE and legacy systems.

SUMMARY

In light of the present need for a method for handling the designation of candidate gateways by the PCRN, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method performed by a Broadband Network Gateway (BNG) to charge a subscriber of a communications network. The method may comprise receiving, from a residential gateway (RG), a message containing subscriber information and sending the received message to a Policy Charging and Rules Node (PCRN) containing a translation node, the received message. The method may also comprise receiving, from the PCRN, a translated message, wherein the translation node in the PCRN translates the received message to the translated message that includes a subscriber ID. The method may also comprise sending the translated message to an online charging system (OCS) and receiving, from the OCS, a charged message, wherein the OCS charged the subscriber associated with the subscriber ID included in the charged message, based on the subscriber's usage of the communications network.

Various embodiments may also relate to a Broadband Network Gateway (BNG) to charge a subscriber of a communications network. The BNG may receive, from a residential gateway (RG), a message containing subscriber information. The BNG may also send, to a Policy Charging and Rules Node (PCRN) containing a translation node, the received message and receive, from the PCRN, a translated message, wherein the translation node in the PCRN translates the subscriber information contained in the received message to the translated message that includes a subscriber ID. The BNG may also send the translated message to an online charging system (OCS); and receive, from the OCS, a charged message, wherein the OCS charged the subscriber associated with the subscriber ID included in the charged message based on the subscriber's usage of the communications network.

Various embodiments may also relate to a method performed by a Policy Charging and Rules Node (PCRN) to charge a subscriber of a communications network. The method may comprise the PCRN receiving, from a broadband network gateway (BNG), an initial message sent from a residential gateway. The method may also comprise the PCRN producing, with a translation node included within the PCRN, a translated message using the subscriber information included in the initial message to include at least an International Mobile Subscriber Identification (IMSI), and sending, to the BNG, the translated message, wherein the IMSI in the translated message is used to charge the associated subscriber for usage of the communications network.

Various embodiments may also relate to a Policy Charging and Rules Node (PCRN) to charge a subscriber of a communications network. The PCRN may comprise a translation node. The translation node may receive, from a broadband network gateway (BNG), an initial message sent from a residential gateway. The translation node may also produce a translated message using the subscriber information included in the initial message to include at least a subscription ID and send, to the BNG, the translated message, wherein the subscription ID in the translated message is used to charge the associated subscriber for usage of the communications network.

Various embodiments may also relate to a system to charge a subscriber of a communications network. The system may comprise of user equipment (UE) to send at least a first message within the communications network, a residential gateway to received and forward the first message, a Broadband Network Gateway (BNG), a PCRN and an OCS. The BNG may receive the first message, send the first message to a Policy Charging and Rules Node (PCRN), receive a first translated message from the PCRN, send the first translated message to the online charging system (OCS), and receive a first charged message from the OCS. The PCRN may comprise a translation node that receives the first message and sends the translated message, wherein the translation node produces the translated message from the first message by translating the subscriber information contained in the first message to at least a subscriber ID. The OCS may receive the first translated message and produce the first charged message, wherein the OCS charges the subscriber associated with the subscriber ID included in the first translated message based on the subscriber's usage of the communications network.

It should be apparent that, in this manner, various exemplary embodiments enable the use of a single subscriber record throughout a communications network. Particularly, by enabling BNG to use the translation node within the PCRN, the system may use information included in messages to associate with a single subscriber record and accordingly charge the subscriber associated with that record for usage of the communications system.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 1:
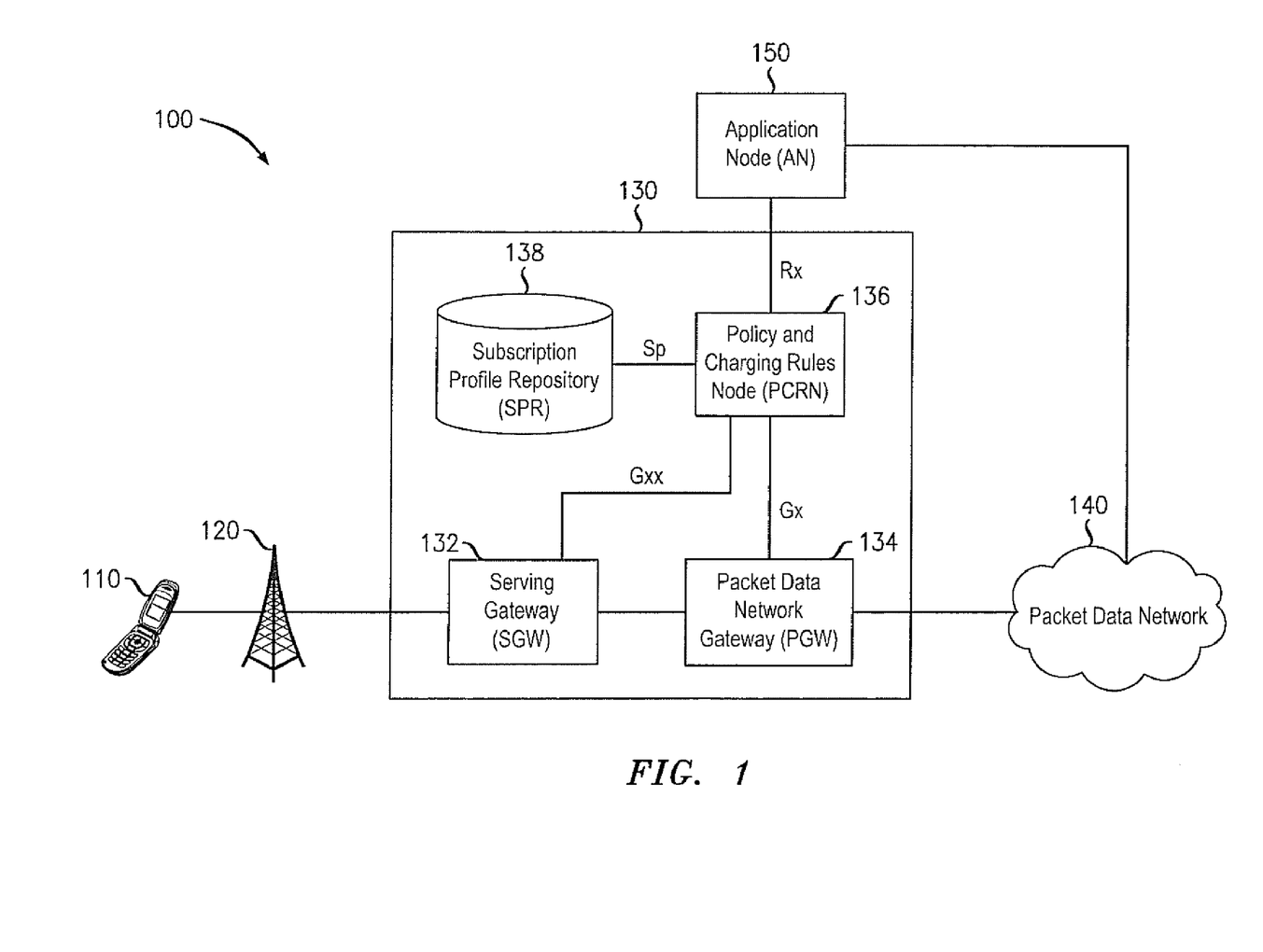
FIG. 1 illustrates an exemplary subscriber network for providing data services.

FIG. 1 illustrates an exemplary subscriber network 100 for providing various data services. Exemplary subscriber network 100 may be a telecommunications network or other network for providing access to various services. Exemplary subscriber network 100 may include at least one piece of user equipment (UE) 110, a base station 120, an evolved packet core (EPC) 130, a packet data network 140, and an application node (AN) 150.

User equipment (UE) 110 may be a device that communicates with the packet data network 140 for providing the end-user with a data service. Such data service may include, for example, voice communication, text messaging, multimedia streaming, and Internet access. Specifically, in various exemplary embodiments, UE 110 is a personal or laptop computer, wireless e-mail device, cellular phone, television set-top box, or any other device capable of communicating with other devices via the EPC 130.

Base station 120 may be a device that enables communication between UE 110 and the EPC 130. For example, the base station 120 may be a base transceiver station such as an evolved nodeB (eNodeB) as defined by 3GPP standards. Thus, the base station 120 may be a device that communicates with the UE 110 via a first medium, such as radio communication, and communicates with the EPC 130 via a second medium, such as an Ethernet cable. Base station 120 may be in direct communication with the EPC 130 or may communicate via a number of intermediate nodes (not shown in FIG. 1). In various embodiments, multiple base stations (not shown) similar to the base station 120 may be present to provide mobility to the UE 110. In various alternative embodiments, UE 110 may communicate directly with the EPC 130. In such embodiments, the base station 120 may not be present.

Evolved packet core (EPC) 130 may be a device or network of devices that provides the UE 110 with gateway access to the packet data network 140. EPC 130 may further charge a subscriber for use of provided data services and ensure that particular quality of experience (QoE) standards are met. Thus, the EPC 130 may be implemented, at least in part, according to the 3GPP TS 29.212, 29.213, 29.214 technical specifications. Accordingly, the EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by the UE 110. SGW 132 may forward such packets towards the PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile Internet Protocol (PMIP) standard, the SGW 132 may include a Bearer Binding and Event Reporting Function (BBERF). In various exemplary embodiments, the EPC 140 may include multiple SGW (not shown) similar to the SGW 132 and each SGW may communicate with multiple base stations (not shown) similar to the base station 120.

Packet data network gateway (PGW) 134 may be a device that provides gateway access to the packet data network 140. PGW 134 may be the final device within the EPC 130 that receives packets sent by user equipment 110 toward the packet data network 140 via the SGW 132. PGW 134 may include a policy and charging enforcement function (PCEF) that enforces policy and charging control (PCC) rules for each service data flow (SDF). Thus, the PGW 134 may be a policy and charging enforcement node (PCEN). PGW 134 may include a number of additional features, such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. In other embodiments, the SPR 138 may be a device separate from the EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
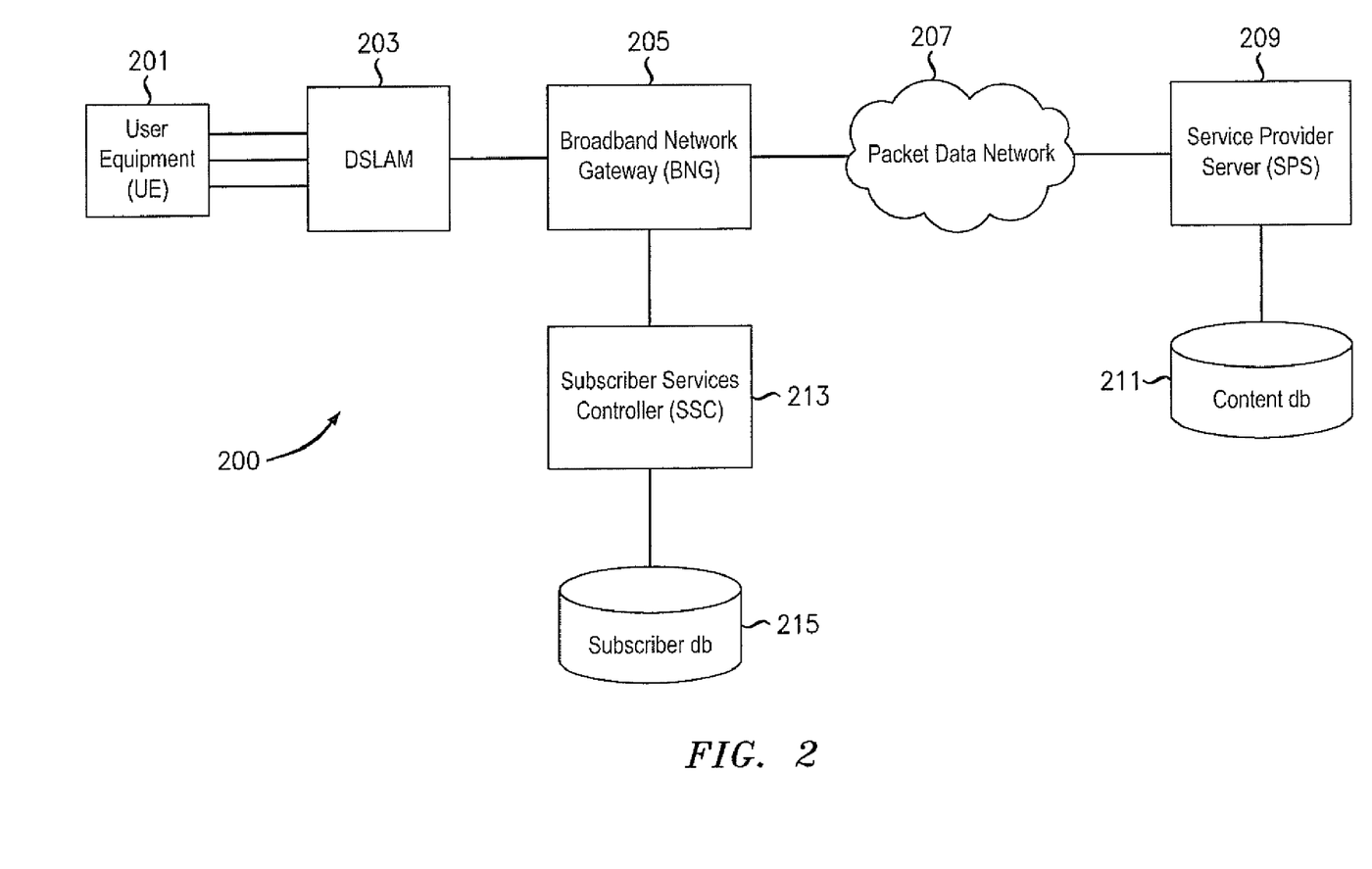
FIG. 2 illustrates an additional exemplary subscriber network for providing data services.

FIG. 2 illustrates an exemplary communications system using, for example, DHCP and RADIUS. Communications system 200 may be similar to communications system 100, where the system 200 may handle one or more requests for service generated by the user equipment (UE) 201 and charge the subscriber associated with the UE 201 for the service. Communications system 200 may include a wireline and/or wireless system and may use one or more protocols, such as, for example, Dynamic Host Configuration Protocol (DHCP), Remote Authentication Dial In User Service (RADIUS), and/or Diameter protocols for routing, authentication, and charging. Communications system 200 may comprise UE 201, a digital subscriber line access multiplexer (DSLAM) 203, a broadband network gateway (BNG) 205, a packet data network 207, a service provider server (SPS) 209, a content database 211, a subscriber services controller (SSC) 213, and a subscriber database 215.

User equipment 201 may be similar to UE 110 of communications system 100. UE 201 may send multiple requests for service by the communications system 200. This may occur, for example, when a UE 201 simultaneously requests voice, video, and data service. In the communications system 200, the different services may be processed separately, as voice services may be processed as a stream separate from voice and data services.

DSLAM 203 may aggregate the plurality of requests generated by the UE 201 and may send the aggregated stream to the broadband network gateway (BNG) 205. DSLAM 203 may be located in the telephone exchanges of service providers and may connect multiple customer digital subscriber lines (DSLs) to the communications network using one or more multiplexing techniques. DSLAM 203 may aggregate voice and data traffic from one or more UEs (not shown) to combine into the composite signal. DSLAM 203 may transfer the aggregated signal using, for example, Ethernet, Asynchronous Transfer Mode (ATM), frame relay, and/or Internet (IP) protocols.

BNG 205 may be an access service network gateway, such as a Broadband Remote Access Server (BRAS), and/or an IP Edge Router that enables a connection of UE 201 to the packet data network 207. BNG 205 may also act as an interface for an authentication, authorization, and accounting (AAA) service, such as RADIUS or Diameter, and may enable the authentication, access, and accounting of the subscriber associated with the UE 201. BNG 205 may route traffic between the DSLAM 203 and the packet data network 207. Such accounting may include collecting resource usage measurements and apportioning charges for services provided by the service provider, e.g., Service Provider Server (SPS) 209 and Content db 211. Authentication and authorization by the BNG 205 may involve ensuring that an identity for a subscriber is genuine and subsequently assigning a set of execution rights to the authenticated subscriber. BNG 205 may also enact policy management and maintain quality of service (QoS). In some embodiments, the BNG 205 may connect to a plurality of access technologies, such as wireline, local wireless networks (e.g., WiFi), and 3G cellular access (not shown). In such instances, BNG 205 may have flexible service provisioning based on the type of access.

As discussed in Technical Report 92 (TR-92) and Technical Report 101 (TR-101), which are herein incorporated by reference, BNG 205 may aggregate subscriber and control traffic information from other connected devices, such as the DSLAM 203 or directly-connected base stations (not shown). In some embodiments, the communications network 200 may use a single BNG 205 to aggregate data for a plurality of user services. In other embodiments, the communications network 200 may employ service segregation, which may include a plurality of BNGs 205, with each BNG 205 used for optimization of a particular service, such as video optimization. In such embodiments, one BNG 205 may handle the delivery of services, for example, delivery of video, while another BNG 205 may handle subscriber management, such as the enforcement of QoS and charging.

In some embodiments, the BNG 205 may query a subscriber database (db) 215 to obtain more subscriber information. In some embodiments, the subscriber services controller (SSC) 213 may handle any subscriber requests generated by the BNG 205. BNG 205 may include an interface, deemed the V interface, for traffic aggregation and class of service distinction, in addition to user isolation and traceability. For example, when the communications network 200 is Ethernet-based, the BNG 205 may use existing Ethernet layer mechanisms, such as a virtual local area network (VLAN) tag to provide a means for aggregation by grouping a number of traffic flows under one VLAN. The VLAN may also enable different classes of service and user isolation by allocating a specific VLAN identifier (VLAN ID) for every DSL port. In some embodiments, a single VLAN ID may be associated with a group of subscribers. In some embodiments, the BNG 205 may assign a specific VLAN and VLAN ID to a subscriber to receive a service. During a subsequent request, the BNG 205 may determine that the subscriber was already assigned a VLAN and may add the service to the existing VLAN by referring to the VLAN ID.

Packet data network 207 may be similar to the packet data network 140 in FIG. 1. Packet data network 207 may be a network that provides a connection between the BNG 205 and the SPS 209, where the SPS 209 provides data through the packet data network 207 in response to requests by the BNG 205.

Service Provider Server (SPS) 209 may be a server that acts as an application service provider, network service provider, and/or Internet service provider that transmits data over the packet data network 207 in response to a request. In some embodiments, the SPS 209 retrieves data stored in a content database (content db) 211.

Subscriber Service Controller (SSC) 213 may use a RADIUS or Diameter AAA service to control communications between the BNG 205 and the subscriber database (subscriber db) 215. In some embodiments, the SSC 213 may track, manage, and enforce defined quality of service (QoS) parameters. SSC 213 may employ deep packet inspection (DPI) to determine subscriber activity. SSC 213 may determine a plurality of values, such as the service source and destination, service type, bandwidth occupied, and current location. Based on such information, the SSC 213 may initiate charging, monitor usage quotas, allow or deny access, and redirect or filter traffic.

Content db 211 and Subscriber db 215 may be devices that store information in the communications network 200. Content db 211 may store data for service, such as video, audio, text, etc. Subscriber db 215 may store information related to subscribers of the communications network 200, such as identifications for each subscriber and indicators for each subscriber, such as subscriber category, bandwidth quotas, charging parameters, and subscriber priority. In some embodiments, the subscriber db 215 may store subscriber identifications based on the type of access. For example, in some embodiments, when the user request originates from a mobile device, the subscriber db 215 may store the mobile device's International Mobile Subscriber Identity (IMSI). Content db 211 and the subscriber db 215 may therefore include a machine-readable storage medium, such as read-only memory (ROM), random-access memory (RAM), magnetic disk storage media, optical storage media, flash-memory devices, and/or similar storage media.

While both communications networks 100, 200 contain storage for subscriber profiles (SPR 138 and subscriber db 215, respectively), the devices may not contain the same subscriber information. For example, communications network 100 may be for a wireline connection, while communications network 200 may be for a wireless connection. In this instance, SPR 138 may use connection information to tie a subscriber to a Point-to-Point Protocol (PPP) ID or a Circuit ID, while the subscriber db 215 may use similar connection information to tie a subscriber to an IMSI. When this occurs, there may be non-standard provisioning by the BNG 205, as the separate subscriber IDs stored in separate databases have no relation to each other, even if both services are tied to the same subscriber.

Figure 3:
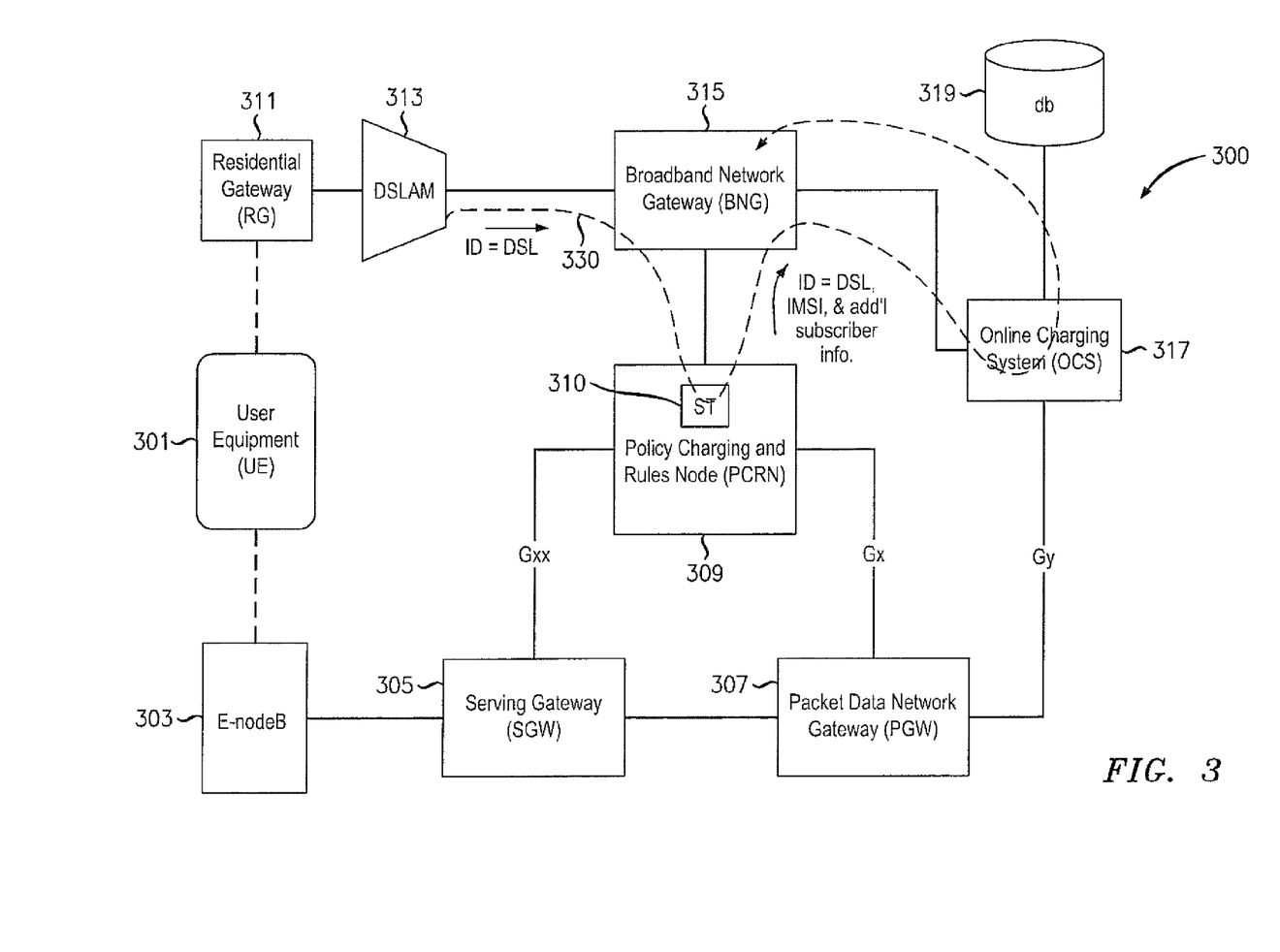
FIG. 3 illustrates an integrated exemplary subscriber network for providing data services.

FIG. 3 illustrates an integrated communications network using a common subscriber database. Communications network 300 contains devices similar to those in communications networks 100, 200, such as UE 301, E-nobeB 303, SGW 305, PGW 307 and PCRN 309 being similar to UE 110, E-nodeB 120, SGW 132, PGW 134, and PCRN 136 of communications network 100. Similarly, DSLAM 313 and BNG 315 may be similar to DSLAM 203 and BNG 205 of communications network 200. Communications network 300 may also include a residential gateway (RG) 311, online charging system (OCS) 317 and database (db) 319.

Residential gateway (RG) 311 may be a device for interfacing with another network that uses different protocols. For example, the RG 311 may convert an incoming request from the UE 301 from an MPLS PDU to an Ethernet frame. Other similar conversions may be performed by the RG 311 based on the protocols used by the UE 301 and the DSLAM 313, respectively. RG 311 may serve as a gateway, in addition to the UE 301, for a plurality of additional devices requesting services and/or data from a service provider server 209.

Online Charging System (OCS) 317 may be a device that enables the charging of a subscriber for usage of a service. As discussed in 3GPP TS 32.296 and 3GPP TS 32.240, which are herein incorporated by reference, in some embodiments, the OCS 317 may enable such charging through real-time monitoring of packets through the communications network 300. OCS 317 may handle a plurality of subscriber types, such as pre-paid subscribers and single-time users, and may therefore be used for unified online charging and control of all network services. Acting in a similar manner to the SSC 213 of communications network 200, the OCS 317 may use an AAA protocol to determine a subscriber's identity and to control the transfer of data from the content db 211 to the packet data network 207. Database (db) 319 may be similar to the Subscriber db 215 of communications network 200. In some embodiments, the db 319 may also contain the same information of SPR 138 in communications network 100.

As will be discussed in relation to FIG. 5, the db 319 may store multiple subscriber IDs for the same subscriber, such as an IMSI, circuit ID, or Network Access Identifier (NAI) based on the type of connection to the communications network 300. In some embodiments, both the BNG 315 and the PCRN 309 may obtain subscriber profile information stored in the db 319 through use of the OCS 317. In some embodiments, the BNG 315 may forward an applicable message to the PCRN 309 to determine additional subscriber attributes. In some embodiments, the PCRN 309 may internally include a subscriber db similar to the SPR 138. The internal subscriber db may add subscriber information to messages received by the PCRN 309. This may enable subsequent actions by the OCS 317 to refer to the same subscriber, regardless of the access type in use.

Figure 6:
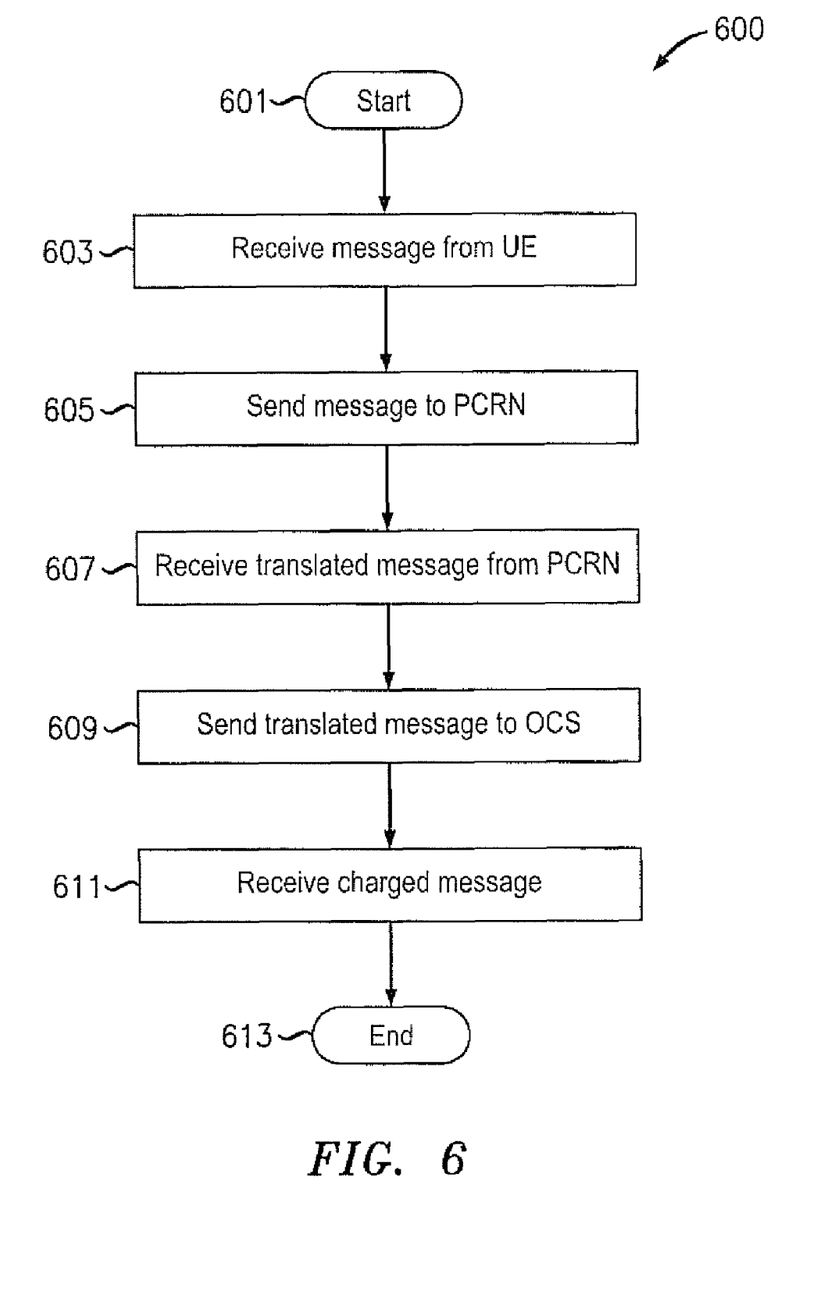
FIG. 6 illustrates an exemplary method of a Broadband Network Gateway (BNG) processing a received message for subscriber information.

In an exemplary operation as will be further discussed in relation to method 600 of FIG. 6, a message including a service request received by the RG 311 and forwarded to the DSLAM 313 may travel upon path 330 for the BNG 315 to properly access the OCS 317 for subscriber information. BNG 315 may receive a message from the DSLAM 313 that may include a subscriber ID associated with the DSL line (i.e., DSL ID). While this DSL ID may be associated with a specific, actual subscriber, in some embodiments, the OCS 317 may not be able to access the actual subscriber using only the subscriber ID. BNG 315 may therefore, forward the received message to the PCRN 309. As will be discussed in relation to FIG. 4, the PCRN 309 contains a subscriber translator (ST) 310 that may add other subscriber IDs associated with the same actual subscriber. In an exemplary embodiment, the additional subscriber IDs may include an International Mobile Subscriber Identity (IMSI) and other additional subscriber IDs. PCRN 309 may then forward the translated message back to the BNG 315, which may then forward the translated message to the OCS 317. OCS 317 may use one of the additional subscriber IDs to charge the actual subscriber for the service included in the message. OCS 317 may then forward the charged message back to the BNG 315, which may then provide the requested service.

Figure 4:
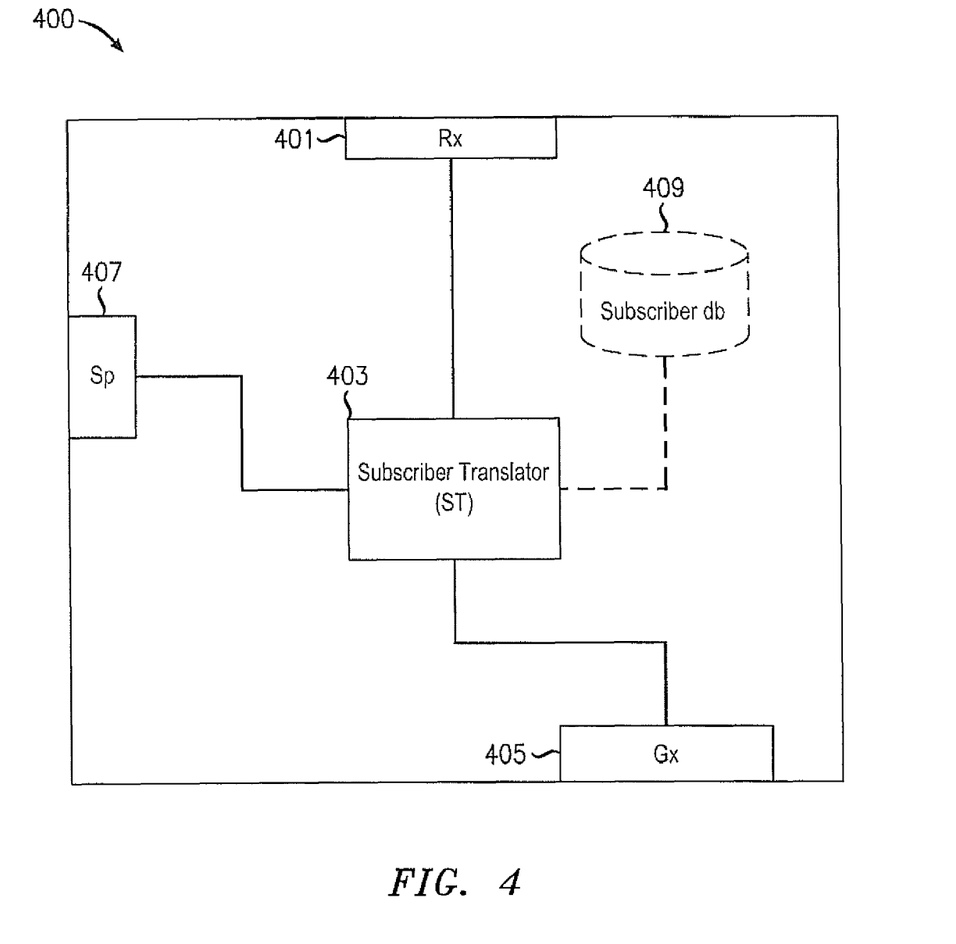
FIG. 4 illustrates an exemplary Policy and Charging Rules Node (PCRN) for processing messages.

FIG. 4 illustrates an exemplary PCRN and its constituent components. PCRN 400 may include Rx interface 401, Subscriber Translator (ST) 403, Gx interface 405, Sp interface 407, and subscriber db 409.

Rx interface 401 may be an interface comprising hardware and/or executable instructions encoded on a machine-readable storage medium configured to communicate with an application node (AN), such as AN 150, or a broadband network gateway, such as BNG 315. Such communications may be implemented according to the 3GPP TS 29.214. For example, Rx interface 401 may receive an application or service requests in the form of an AAR.

Subscriber Translator (ST) 403 may be a device that connects to at least the Rx interface 401, the Gx interface 405, and the Sp interface 407. In some embodiments, the ST 403 may also connect to the Subscriber db 409. The ST 403 may receive a message on any of these interfaces and may output the message with a translated subscriber ID to the same interface, or to another interface. In some embodiments, ST 403 may add additional subscriber information to the translated message before sending it to an interface.

Gx interface 405 may be an interface comprising hardware and/or executable instructions encoded on a machine-readable storage medium configured to communicate with a PGW, such as PGW 134, 307. Such communication may be implemented according to the 3GPP TS 29.212. Thus, Gx interface 405 may receive requests for PCC rules and transmit PCC rules for installation. Gx interface 405 may also receive requests originating from the UE for application or service requests in the form of a CCR. The CCR may include subscriber information, such as an MSISDN, IMSI, circuit ID, or PPP ID, depending, for example on the type of access the subscriber had when generating the request.

Sp interface 407 may be an interface comprising hardware and/or executable instructions on a machine-readable storage medium configured to communicate with an SPR such as SPR 138. Sp interface 407 may transmit record requests and receive subscription profile records. In some embodiments, the Sp interface 407 may also transmit subscription identifiers, which the SPR 138 may use to update the subscriber profile record.

Subscriber db 409 may be a device that stores information related to subscribers received by the PCRN 400. Thus, the subscriber db 409 may include a machine-readable storage medium such as read-only memory (ROM), random-access memory (RAM), magnetic disk storage media, optical storage media, flash-memory devices, and/or similar storage media. As will be discussed in relation to FIG. 5, data stored by the subscriber db 409 may be in the form of a subscription record and may include one or more subscriber IDs received by the PCRN 400 in service requests. Such subscriber IDs may be based on the type of access, such as circuit ID or DSL ID for wireline messages, and IMSI or NAI for wireless messages. ST 403 may retrieve one or more subscriber IDs so OCS 317 may use the subscriber ID to charge the proper actual subscriber for a requested service.

Having described the elements of the PCRN 400, a brief example of operation is now provided. Further details of this method of operation will be further discussed below in FIG. 7 in relation to method 700. ST 403 may receive a message from the BNG 315 through the Rx interface that includes subscriber information in the form of a DSL ID. Such subscriber identification may be provided when the connection type for the subscriber is a wireline connection type over a DSL connection. ST 403 may then lookup the actual subscriber in the internal subscriber ID 409 or the SPR 138 via the Sp interface. Upon lookup, the ST 403 may retrieve additional IDs associated with the same actual subscriber and DSL ID. In some embodiments, ST 403 may perform a lookup through communication with the internal subscriber db 409. In some embodiments, ST 403 may make an additional lookup through communications with the SPR 138 via the Sp interface 407. In other embodiments, the lookup with the SPR 138 may be conducted in lieu of the lookup with the internal subscriber db 409. The additional subscriber IDs may have been received by the PCRN 400, for example, upon receipt of an initial Gx CCA message from PGW 134 via the Gx interface 405. ST 403 may then add one or more of the additional subscriber IDs, such as MSISDN and associated IMSI, to the message. Once added, the ST 403 may transmit the translated message via the Rx interface back to the BNG 315. With the additional information, BNG 315 may refer to the OCS 317 to charge the actual subscriber for service, with the OCS 317 charging subscriber using one of the additional subscriber IDs included in the translated message.

Figure 5:
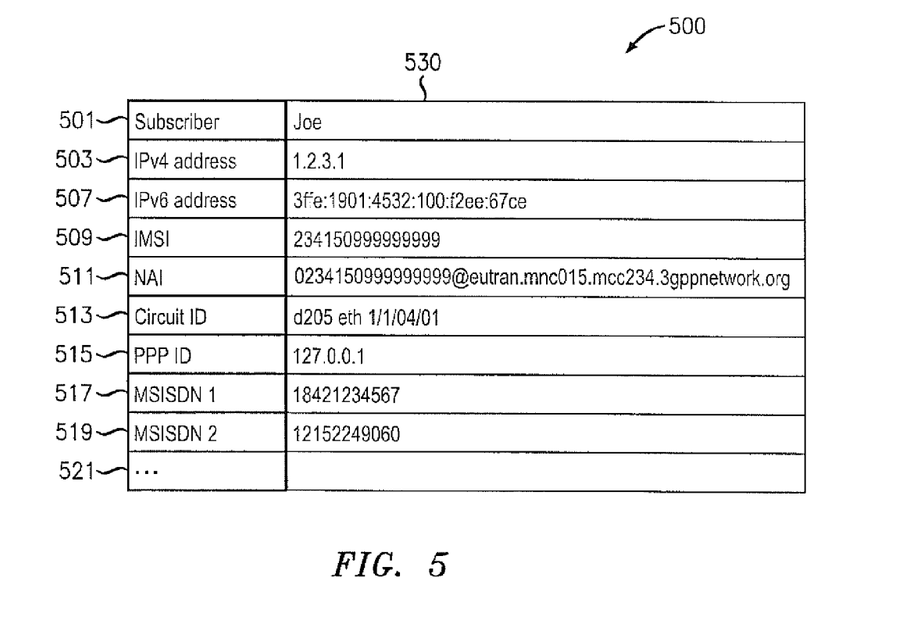
FIG. 5 illustrates an exemplary subscriber record stored in a subscriber database (db)

FIG. 5 illustrates an exemplary subscriber identification entry stored in a subscriber db or SPR. Subscriber entry 500 may act as a single record for all information associated with a single, actual subscriber collected and stored by various devices in a communications system, such as communications system 300. Such information includes the actual subscriber field 501, IPv4 address 503, IPv6 address (or prefix) 507, and a series of subscriber identifiers (subscriber IDs) 509-521, such as International Mobile Subscriber Identity (IMSI) 509, Network Access Identifier (NAI) 511, Circuit ID 513, Point-to-Point Protocol (PPP) ID 515, Mobile Subscriber ISDN Numbers (MSISDN) 517-519, and additional subscriber identification 521. In some embodiments, at least one of the subscriber IDs 509-521 may contain a value. The actual values for the subscriber record 500 may be stored in value column 530.

Subscriber entry 500 may be a composite subscriber record created from one or more service requests by a single actual subscriber over a period of time. This may include, for example, a connection over a wireless connection to the E-node B 303 and a wireline connection to a residential gateway 311. In some embodiments, both the wireless and wireline connections may share an IPv4 address 503 and/or IPv6 prefix 507. In some embodiments, the subscriber profile 500 may contain multiple IPv4 and/or IPv6 addresses (not shown). Each IPv4 address 503, IPv6 prefix 505, and subscriber ID 509-521 may be associated with an actual subscriber 501 in a given message. In some embodiments, a message may contain subscriber profile information, including the actual subscriber 501 and values for some of the fields 503-521, including at least one subscriber ID 509-521. Upon receipt, a device such as the PCRN 309 or OCS 317 may forward the additional values to the SPR 138, and/or subscriber db 319, 409.

Subscriber IDs 509-521 may be addresses or other identification information associated with the actual subscriber 501. In some embodiments, the subscriber ID 509-521 may be based on the type of connection. For example, IMSI 509 or MSISDNs 517-519 may be identifiers associated with a single subscriber using a wireless connection over a mobile connection to a GSM or UMTS network. Likewise, Network Access Identifier (NAI) 511 may be assigned to the actual subscriber 501 is using a wireless connection over a mobile connection to an eHPRD (Evolved High Packet Rate Data) network. Similarly, a circuit ID or PPP ID may be associated with the actual subscriber 501 when establishing a wireline connection.

In an exemplary embodiment, the ST 403 of the PCRN 400 may retrieve the value column 530, including one or more subscriber IDs 509-521, add them to the received message, and transmit the translate message through one of the interfaces 401, 405. Another device, such as OCS 317, may choose which of the plurality of subscriber IDs 509-521 to use to acquire the subscriber profile. The acquired subscriber profile may then be used to charge the actual subscriber for the service requested.

FIG. 6 is a flowchart illustrating an exemplary method of the BNG 315 retrieving subscriber information for charging. BNG 315 may use method 600 to retrieve additional subscriber information and charge the actual subscriber for the requested service. Method 600 begins at step 601 and proceeds to step 603, where the BNG 315 receives a message from the UE 301. BNG 315 may receive a message from the UE 301 through the RG 311 and the DSLAM 313. In some embodiments, the BNG 315 may receive a message including a service request and some subscriber information from the DSLAM 313. BNG 315 may then in step 605 send the received message to the PCRN 309. This may occur, for example, when the message received by the BNG 315 only contains subscriber IDs that the OCS 317 does not recognize. In some embodiments, the BNG 315 may send every message received to the PCRN 309.

In step 607, the BNG 315 may receive a translated message from the PCRN 309. The translated message may contain additional subscriber IDs than that of the received message that was sent to the PCRN 309 in step 605. For example, the BNG 315 may send to the PCRN 309 a received message that includes a circuit ID. BNG 315 may then receive a translated message back from the PCRN 309 that includes both the circuit ID and an IMSI associated with the same actual subscriber. BNG 315 may then in step 609 transmit the translated message to the OCS 317.

In step 611, the BNG 315 may receive a charged message from the OCS 317. The charged message may include charging information for the actual subscriber requesting service. Such charging information may include, for example, charging rates, bandwidth levels, priority levels, and similar charging quantities for a service. In some embodiments, such information is stored with the subscriber profile information in the db 319. In other embodiments, the charging information may be stored in a separate SPR 138. OCS 317 may use at least one of the included subscriber IDs included in the translated message sent from the BNG 315 in step 609 in order to determine the actual subscriber and retrieve the relevant charging information. For example, the OCS 317 may use the additional IMSI included in the translated message to retrieve the applicable subscriber profile and charging information for the actual subscriber associated with the circuit ID. BNG 315 in step 611 receives the charged message from the OCS 317 after the OCS 317 adds the charging information to the translated message. Method 600 may then end at step 613.

Figure 7:
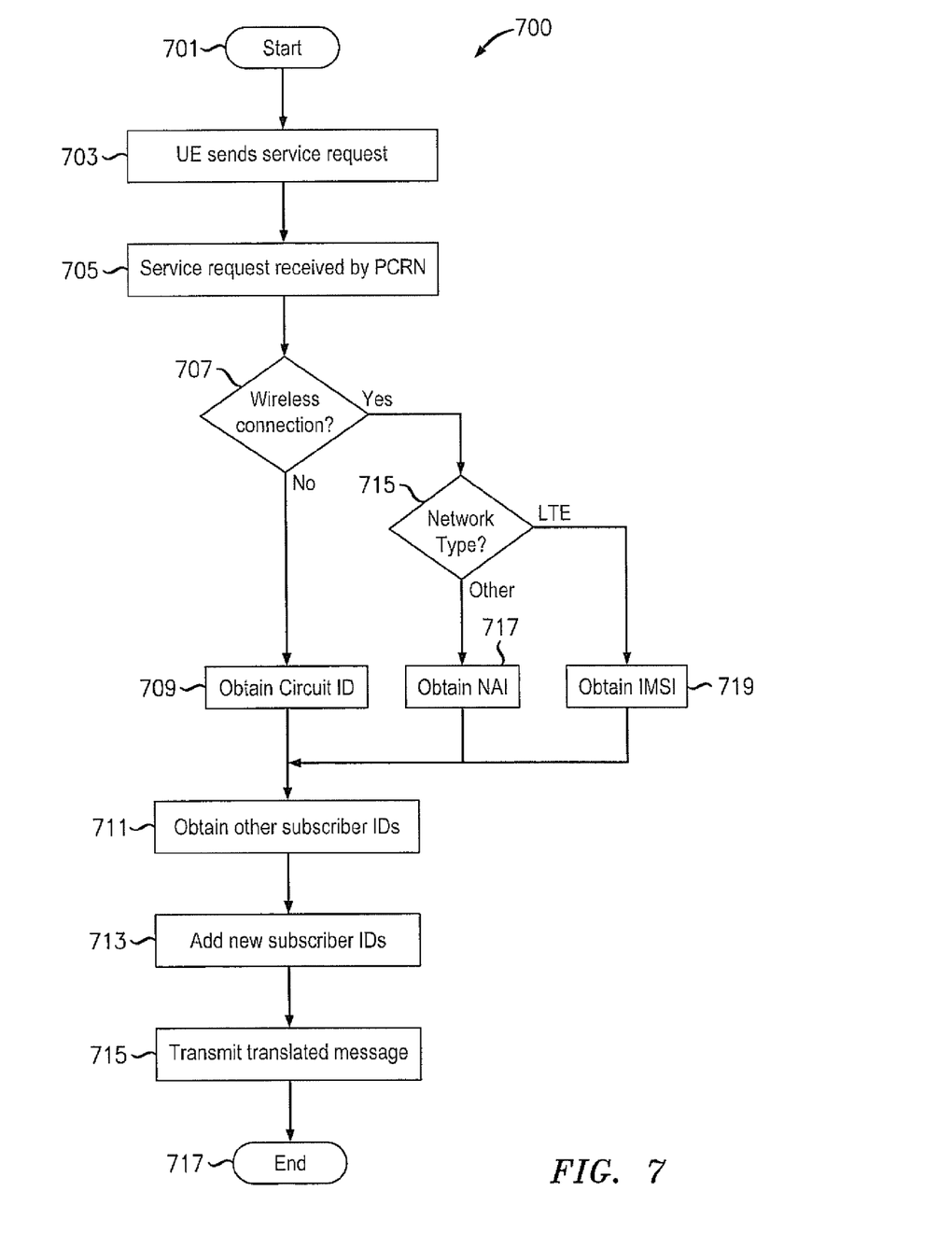
FIG. 7 illustrates an exemplary method of a PCRN processing a received message for subscriber information.

FIG. 7 is a flowchart illustrating an exemplary method for the PCRN 400 to translated a received message. PCRN 400 may perform method 700 upon receipt of a message via an interface, such as Rx interface 401 or Gx interface 405. Method 700 begins at step 701 and proceeds to step 703, where the UE 301 sends a service request. In the exemplary embodiment, UE 301 sends a service request in a message through the RG 311 and the DSLAM 313 to the BNG 315, with the BNG 315 forwarding the message to the PCRN 309. PCRN 309 then receives the service request in step 705. In other embodiments, the PCRN 309 may receive the message from the UE 301 when it receives the message through SGW 305 or PGW 307.

In step 707, the PCRN 400 may determine whether the UE 301 requesting service is connected with a wireless or wireline connection. When the PCRN 400 determines that there is a wireless connection, PCRN 400 may then proceed to step 715 to determine the type of wireless connection; otherwise, the PCRN 400 may proceed to step 709 to obtain the applicable circuit or PPP ID from the received message. In step 715, the PCRN 400 may determine whether the network type is an LTE or similar network type that uses IMSI for subscriber identification, or whether the network type uses a legacy identifier, such as NAI. If the PCRN 400 determines that the network is LTE, the PCRN 400 may in step 719 obtain the IMSI from the message; otherwise, the PCRN in step 717 may obtain the NAT from the received message.

In steps 709, 717, and 719, the PCRN 400 may extract the applicable subscriber ID from the received message. The type of subscriber ID may be based on the type of connection. In any of these cases, the PCRN may then in step 711 obtain other applicable subscriber IDs. PCRN 400 may use the ST 403 to retrieve a subscriber profile from the subscriber db 409 or the SPR 138, which may include additional subscriber IDs associated with the same actual subscriber other than the subscriber ID included in the received message. In step 713, the PCRN 400 in ST 403 may add the other subscriber IDs to the message, creating a translated message. PCRN 400 may then in step 715 transmit the translated message via an interface to another device; method 700 may then end at step 717.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A method performed by a Broadband Network Gateway (BNG) to charge a subscriber of a communications network, the method comprising:
    receiving, from a residential gateway (RG), a message having subscriber information;
    sending, to a Policy Charging and Rules Node (PCRN) having a translation node, the received message;

receiving, from the PCRN, a translated message created by the translation node, wherein the translated message comprises the received message and at least one additional subscriber ID;

sending the translated message to an online charging system (OCS); and receiving, from the OCS, a charged message, wherein the OCS charged the subscriber associated with the subscriber ID included in the charged message, based on the subscriber's usage of the communications network.

2. The method of claim 1, wherein the OCS contacts a database containing information associating the subscriber with the subscriber ID included in the translated message.

3. The method of claim 1, wherein the subscriber ID included in the translated message is based on the access method of the subscriber.

4. The method of claim 3, wherein the subscriber ID comprises an International Mobile Subscriber Identification (IMSI).

5. The method of claim 3, wherein the subscriber ID comprises a Network Access Identifier (NAI).

6. The method of claim 1, wherein the receiving from PCRN step further comprises:
the PCRN retrieving, from a Subscription Profile Repository (SPR), the subscriber ID associated with the subscription information included in the received message.

7. A Broadband Network Gateway (BNG) to charge a subscriber of a communications network, wherein the BNG:
receives, from a residential gateway (RG), a message containing subscriber information;
sends, to a Policy Charging and Rules Node (PCRN) containing a translation node, the received message;
receives, from the PCRN, a translated message created by the translation node, wherein the translated message comprises the received message and at least one additional subscriber ID;
sends the translated message to an online charging system (OCS); and
receives, from the OCS, a charged message, wherein the OCS charged the subscriber associated with the subscriber ID included in the charged message based on the subscriber's usage of the communications network.

8. The BNG of claim 7, wherein the OCS contacts a database containing information associating the subscriber with the subscriber ID included in the translated message.

9. The BNG of claim 7, wherein the subscriber ID included in the translated message is based on the access method of the subscriber.

10. The BNG of claim 9, wherein the subscriber ID comprises an International Mobile Subscriber Identification (IMSI).

11. The BNG of claim 9, wherein the subscriber ID comprises a Network Access Identifier (NAI).

12. The BNG of claim 7, wherein the receiving from PCRN step further comprises:
the PCRN retrieving, from a Subscription Profile Repository (SPR), the subscriber ID associated with the subscription information included in the received message.

13. A method performed by a Policy Charging and Rules Node (PCRN) to charge a subscriber of a communications network, the method comprising:
receiving, from a broadband network gateway (BNG), an initial message sent from a residential gateway;
obtaining at least one additional subscriber ID associated with the subscriber information included in the subscriber information in the received message;
producing, a translated message using the subscriber information included in the initial message to include at least an International Mobile Subscriber Identification (IMSI); and
sending, to the BNG, the translated message, wherein the IMSI in the translated message is used to charge the associated subscriber for usage of the communications network.

14. The method of claim 13, wherein the subscriber ID included in the translated message is based on the access method of the subscriber.

15. The method of claim 14, wherein the subscriber ID comprises an International Mobile Subscriber Identification (IMSI).

16. The method of claim 14, wherein the subscriber ID comprises a Network Access Identifier (NAI).

17. The method of claim 13, wherein the PCRN further comprises:
an Sp interface that connects the PCRN to a Subscription Profile Repository (SPR) that contains a record associating the subscription information included in the received message with at least one subscription ID;
a Gx interface that connects the PCRN to a Policy Data Network Gateway (PGW) that uses the subscription ID.

18. A Policy Charging and Rules Node (PCRN) to charge a subscriber of a communications network, the PCRN comprising:
a translation node that
receives, from a broadband network gateway (BNG), an initial message sent from a residential gateway;
obtains at least one additional subscriber ID associated with the subscriber information included in the subscriber information in the received message;
produces, a translated message using the subscriber information included in the initial message to include at least a subscription ID; and
sends, to the BNG, the translated message, wherein the subscription ID in the translated message is used to charge the associated subscriber for usage of the communications network.

19. The PCRN of claim 18, further comprising:
an Sp interface that connects the PCRN to a Subscription Profile Repository (SPR) that contains a record associating the subscription information included in the received message with at least one subscription ID;
a Gx interface that connects the PCRN to a Policy Data Network Gateway (PGW) that uses the subscription ID.

20. The PCRN of claim 18, wherein the subscription ID included in the translated message is based on the access method of the subscriber.

21. The PCRN of claim 20, wherein the subscriber ID comprises an International Mobile Subscriber Identification (IMSI).

22. The PCRN of claim 20, wherein the subscriber ID comprises a Network Access Identifier (NAI).

23. A system to charge a subscriber of a communications network, the system comprising:
user equipment (UE) to send at least a first message within the communications network;
a Broadband Network Gateway (BNG) that:
receives the first message,
sends the first message to a Policy Charging and Rules Node (PCRN),
receives a first translated message from the PCRN,
sends the first translated message to the online charging system (OCS), and
receives a first charged message from the OCS;

a PCRN comprising a translation node that receives the first message and sends the translated message, wherein the translation node produces the translated message from the first message by translating the subscriber information contained in the first message to at least one additional subscriber ID; and a OCS that receives the first translated message and produces the first charged message, wherein the OCS charges the subscriber associated with the subscriber ID included in the first translated message based on the subscriber's usage of the communications network.

24. The system of claim 23, further comprising:

a Subscription Profile Repository (SPR) that contains a record associating the subscription information included in the received message with at least one subscription ID; and a Policy Data Network Gateway (PGW) that uses the subscription ID.

25. The system of claim 23, wherein the subscriber ID included in the translated message is based on the access method of the subscriber.

26. The system of claim 25, wherein the subscriber ID comprises an International Mobile Subscriber Identification (IMSI).

27. The system of claim 25, wherein the subscriber ID comprises a Network Access Identifier (NAI).

* * * * *

UNITED STATES PATENT AND TRADEMARK OFFICE
CERTIFICATE OF CORRECTION

| | | |
|---|---|---|
| PATENT NO. | : 8,295,170 B2 | Page 1 of 1 |
| APPLICATION NO. | : 12/824817 | |
| DATED | : October 23, 2012 | |
| INVENTOR(S) | : Fernando Cuervo | |

It is certified that error appears in the above-identified patent and that said Letters Patent is hereby corrected as shown below:

Title page, item [54] and Col. 1, Title, should read as follows: --PCRN-OCS INTERACTION IN WIRELESS-WIRELINE CONVERGENCE--

Signed and Sealed this
Eighteenth Day of December, 2012

David J. Kappos
*Director of the United States Patent and Trademark Office*